United States Patent [19]

Maresca

[11] 4,329,783
[45] May 18, 1982

[54] RAFTER FINDER

[75] Inventor: Joseph A. Maresca, Greenlawn, N.Y.

[73] Assignee: Grumman Allied Industries, Inc., Melville, N.Y.

[21] Appl. No.: 117,065

[22] Filed: Jan. 31, 1980

[51] Int. Cl.³ .............................................. G01B 3/28
[52] U.S. Cl. ................................................ 33/169 R
[58] Field of Search ............ 33/169 R, 169 B, 185 R; 408/241 G, 115 B

[56] References Cited

U.S. PATENT DOCUMENTS

| | | | |
|---|---|---|---|
| 1,679,473 | 8/1928 | Kabisius | 33/169 B |
| 2,480,725 | 8/1949 | Gilbert | 33/137 |
| 2,878,845 | 3/1959 | Hale | 408/72 X |
| 2,958,349 | 11/1960 | McNutt | 408/72 |
| 2,992,488 | 7/1961 | Barrett | 33/169 R |
| 3,048,925 | 8/1962 | Klaus | 33/169 R |
| 3,086,408 | 4/1963 | Donals | 408/115 |
| 3,538,611 | 11/1970 | Nowell | 33/169 R |
| 3,872,598 | 3/1975 | Bachner et al. | 33/169 R |

*Primary Examiner*—Harry N. Haroian
*Attorney, Agent, or Firm*—Mellor A. Gill

[57] ABSTRACT

A hand tool for locating and measuring the location of inaccessible rafters and studs from the outside of a roof or wall. The tool has a base plate and a tubular guide fixedly mounted at an angle to the base plate. A measuring rod appropriately marked with measurement indicia is a sliding fit into the bore of the guide. The tool is used by drilling a hole through the roof or wall, using the tubular guide as a drill guide, and then inserting the measuring rod into the guide and moving it until the tip of the rod encounters the side of a rafter or stud. After noting the measurement indicated on the rod, the rod and base plate are removed. The noted measurement will be the distance from the center line of the drilled hole to the centerline of the rafter or stud.

2 Claims, 2 Drawing Figures

RAFTER FINDER

BACKGROUND OF THE INVENTION

FIELD OF THE INVENTION

This invention relates to hand tools and, more particularly, to a rafter locating and measuring device.

BACKGROUND OF THE INVENTION

The present energy crisis has resulted in a greater interest in solar collector systems for use in supplementing the energy input into buildings, particularly into private dwellings. For obvious reasons, solar collectors are generally mounted on the roofs of the dwellings. In mounting the collectors themselves, structural considerations dictate that the mounting bolts therefor be fastened into the rafters of the roof. A knowledge of the precise location of the rafters thus becomes a requirement. Because of the shingles, tar paper, and other material used in roof construction, it is not feasible to tap the roof with a hammer to locate the rafter by sound or feel. The use of one of the various types of magnetic stud finders is ruled out by the nails used to fasten down the shingles. An expedient that remains is for the workman to drill randomly into the roof until a rafter is located and thereafter sealing the excess holes that were drilled in the course of the search.

DESCRIPTION OF THE PRIOR ART

As set forth above, the various magnetic stud finders are not feasible for locating rafters because of the shingle nails used in the roofing. In the prior art, however, there is a showing in U.S. Pat. No. 2,992,488, issued to R. Berrett, of a wall stud or brace finder that could be used to locate rafters. As shown in that patent, the tool comprises a bent tubular body containing therein an integral flexible wire or tape member. The tool is used by first drilling a hole in the roof, inserting the tool body containing the flexible wire into the hole, and probing for a rafter with the flexible wire. When a rafter is located, the tool is withdrawn, and is used as a reference means to mark the location of the rafter with respect to the drilled hole. Unlike the subject invention, the tool of Berrett cannot be used as a drill guide, it is not provided with the indicia to provide a precise reading as to the distance of the rafter from the drilled hole, and it does not provide a means for determining unambiguously the precise centerline if the drill enters the rafter itself when the hole for the tool is drilled.

SUMMARY OF THE INVENTION

The invention is a hand tool that can be used from the outside of a roof or wall to locate precisely inaccessible rafters, studs, braces and the like. The tool has a tubular guide element fixedly mounted at an angle on a flat base plate, the bore of the guide extending through the base plate, and a measuring rod which is a sliding fit in the bore of the guide. The measuring rod has inscribed thereon a scale which provides in use a measurement of the distance from the tool to the rafter or stud being located. In use, the measuring rod is inserted in a hole which has been drilled in the roof or wall, using the tool as a guide, until the tip of the measuring rod touches a rafter or stud and the distance from the drilled hole to the center line of the rafter or stud is read off directly from the scale on the measuring rod.

It is thus a principal object of the invention to provide a hand tool which can be used from the outside surface of a roof or wall to locate precisely inaccessible rafters or studs therein.

It is a further object of the invention to provide a hand tool for locating inaccessible rafters and studs which only requires the drilling of one hole for the purpose, and in which the tool itself is used as a guide to insure that that hole is drilled precisely.

Another object of the invention is to provide a tool for accomplishing the above objects that is inexpensive, durable, and reliable, and which is readily used even by an untrained person.

DESCRIPTION OF THE DRAWINGS

For the purpose of illustrating the invention, there is shown in the drawings the form which is presently preferred; it should be understood, however, that the invention is not necessarily limited to the precise arrangement here shown.

DESCRIPTION OF THE PREFERRED EMBODIMENT

Figure 1:
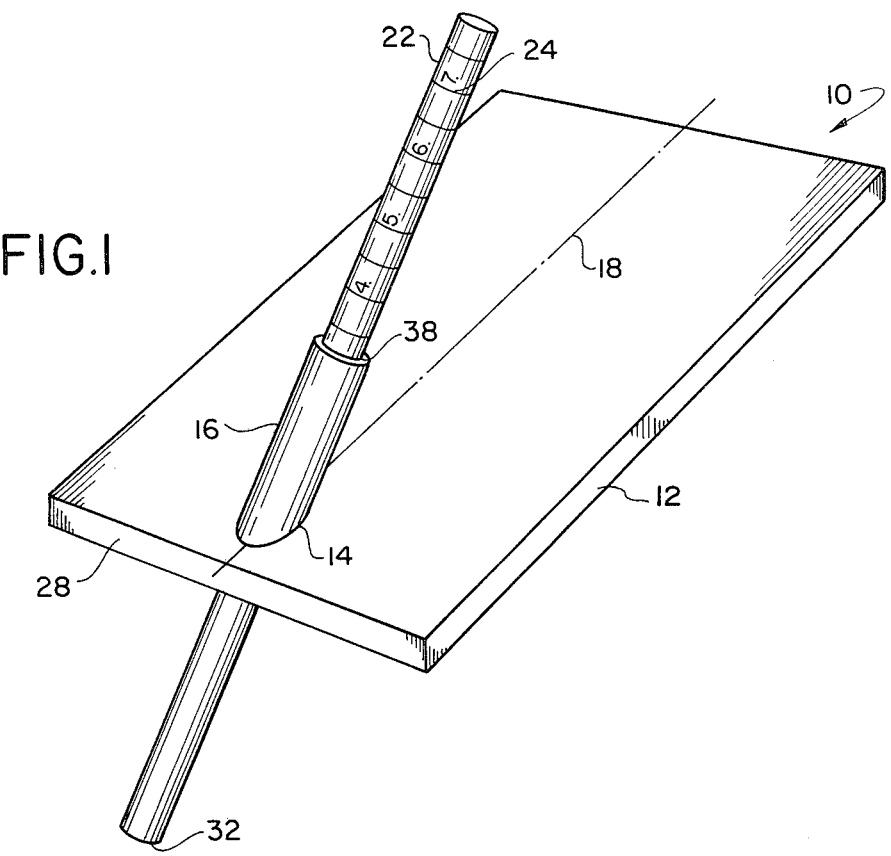
FIG. 1 is a perspective view of a preferred embodiment of the rafter finder of the invention.

Having now more particular reference to the drawings, FIG. 1 shows a preferred embodiment of the rafter finder 10 of the invention. For convenience of exposition, the emphasis herein will be on the tool being employed to find rafters; it will be appreciated that the tool can also be used to locate scantlings such as studs and braces in walls, partitions, and the like, and the emphasis herein on locating rafters for the purpose, for example, of installing solar collectors thus is in no way intended as implying a limitation thereto. Tool 10 has a base plate 12 having fixedly mounted thereon, as by brazing 14, a cylindrical guide element 16. Guide 16 is mounted on the base plate 12 at a predetermined angle in a plane bisecting the longitudinal centerline of the guide and passing through the longitudinal centerline 18 of the base plate. A coaxial bore 20 which extends through the base plate is provided in the guide. Inserted in bore 20 and having a sliding fit therewith is a measuring rod 22 which is inscribed with the indicia 24 of a suitable measuring scale. Any suitable material such as aluminum can be used for the base plate, guide, and measuring rod but inasmuch as the tool is used as a drill guide in operation for drilling a hole, the bore 20 should be of a suitable hardness to serve the purpose without undue wear.

Figure 2:
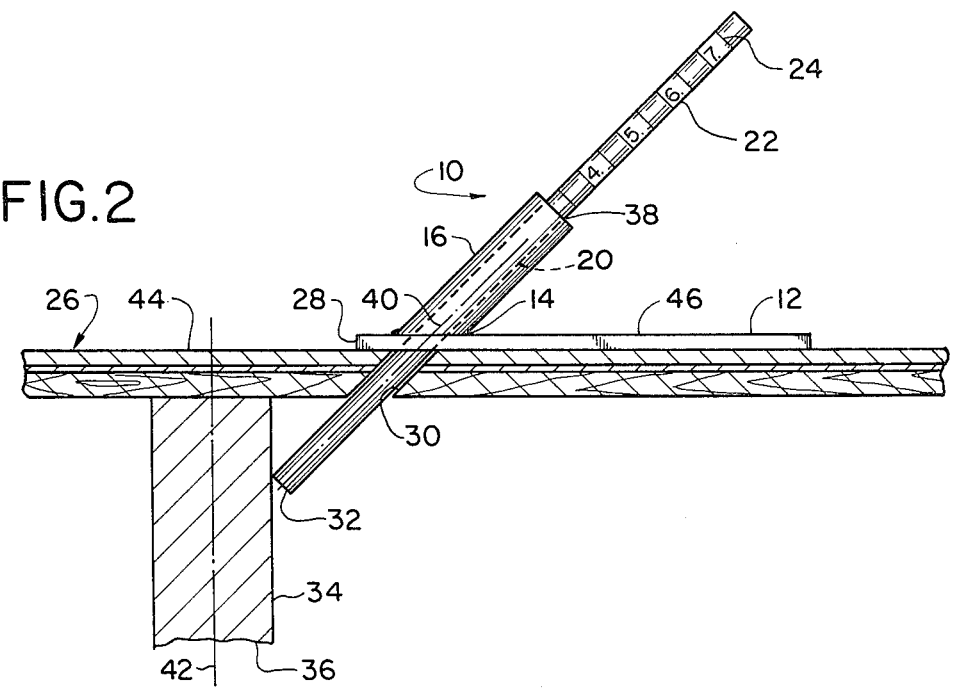
FIG. 2 is a cross-sectional side elevation of the rafter finder of the invention in operation.

In operation, the measuring rod is withdrawn from the bore 20 and the tool is positioned flat on the roof 26 in a location estimated to be near a rafter. The front edge 28 (which is normal to the longitudinal centerline 18) of the base plate is aligned parallel to the lie of the rafters. Positioning a drill bit (not shown) into bore 20, a hole 30 is drilled through the roof. Holding the base and guide in place, the drill bit is withdrawn and the measuring rod is inserted into the guide. The measuring rod is then moved into the guide until (as shown in FIG. 2) the nose 32 of the rod encounters the side 34 of a rafter 36. Using the upper edge 38 of the guide as an index point, the distance from the center line 40 of the hole 30 to the centerline 42 of the rafter is indicated directly on the measuring rod. After the measuring rod and tool is removed, a ruler or scale can be used to lay out from the leading edge of the drilled hole the distance indicated on the measuring rod to the centerline 42 of the rafter and the location can be marked appropriately for future use.

It will be seen that the side 34 of the rafter is one side, the top 44 of the roof is the second side, and the measuring rod 22 is the hypotenuse of a right-angled triangle. Therefore, it will also be seen, when the angle of the guide with the base plate and the height of the guide is taken into consideration, that simple geometry is used to scale the indicia on the measuring scale of the rod. For example, in a tool with the base plate 12 having a thickness of 0.125 inch and with the guide 16 having a 45° angle therewith, surface 38 at the center line 40 thereof (center line 40 is, of course, also the center line of rod 22 and of drilled hole 30) is 1 inch from the top surface 46 of the base plate. Measuring rod 22 is a 0.125 inch diameter steel rod that is 12 inches long. The indicia 24 thereon has a spacing of 0.71 inch with the first indicia, the 2-inch marking (not shown), being inscribed on the rod 3.09 inches from the rod end 32. It will be found that the distance from a line in the plane of side 34 of the rafter to center line 40 at surface 38 is 2.19 inches; thus $2.19/\cos 45° = 2.19/.707 = 3.09$ inches, which is the distance (of the 2-inch indicia mark) from the side 34 of the rafter to the top surface 38 of the guide. The 3-inch mark on the rod will therefore be 4.51 inches from rod end 32; the 4-inch mark, 5.92 inches; the 5-inch mark, 7.34 inches, and so on.

Although shown and described in what is believed to be the most practical and preferred embodiment, it is apparent that departures from the specific method and design described will suggest themselves to those skilled in the art and may be made without departing from the spirit and scope of the invention. I, therefore, do not wish to restrict myself to the particular construction illustrated and described, but desire to avail myself of all modifications that may fall within the scope of the appended claims.

Having thus described my invention, what I claim is:

1. A hand tool for use from the outside of a roof or wall to locate an inaccessible structural member such as a rafter therein comprising in combination:

a substantially flat base plate having fixedly mounted thereon at a fixed predetermined angle thereto an upstanding integral tubular guide element, the bore thereof extending the length of said guide element and through said base plate whereby said guide element can be used as a drilling guide for a drill bit to drill a hole at the angle of said guide element through said roof, and whereby the upper edge of said guide element is normal to said bore such that said upper edge serves as an index; and a measuring rod that can be inserted into said bore of said guide element and through said angled hole drilled in said roof until the tip of said rod encounters a rafter, said rod having indicia thereon related to said predetermined guide element angle, the measurement indicated by said index with reference to said indicia on said rod when its tip is in contact with said rafter indicating the distance from the centerline of said drilled hole to the centerline of said rafter, whereby, after removal of said base plate and rod, said rafter centerline can be located precisely from the outside of said roof by use of said measurement that had been indicated by said index and said indicia on said rod.

2. The hand tool of claim 1 wherein the angle of the guide element to the base plate is in a plane bisecting the longitudinal centerline of said guide element and passing through the longitudinal centerline of said base plate, and wherein the tool is positioned for use with said base plate longitudinal centerline aligned normal to the lie of the rafter being located.

* * * * *